Dec. 19, 1922.

H. R. WARD.
TOOTHBRUSH.
FILED MAY 19, 1921.

1,439,279

Inventor
Howard R. Ward
By His Attorney

Patented Dec. 19, 1922.

1,439,279

UNITED STATES PATENT OFFICE.

HOWARD R. WARD, OF NEW YORK, N. Y.

TOOTHBRUSH.

Application filed May 19, 1921. Serial No. 470,881.

*To all whom it may concern:*

Be it known that I, HOWARD R. WARD, a citizen of the United States, and resident of borough of Manhattan, county of New York, State of New York, have invented certain new and useful Improvements in Toothbrushes.

This invention relates to improvements in tooth brushes and most particularly to the type of brush having a handle formed to comprise a receptacle which may carry a roll of dental floss.

The principal object of the invention is to provide a moisture proof container in the handle of the brush, the closure of which is a cap used on the commercial dental floss container.

With this object in view the invention consists of the novel construction, combination and arrangement of parts which will be set forth in the following specification, claimed, and illustrated in the accompanying drawings in which:

Figure 1:
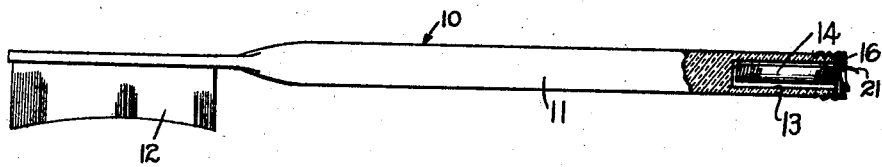
Fig. 1 is a view of a tooth brush, the rear end of the handle being shown in section.
Figure 2:
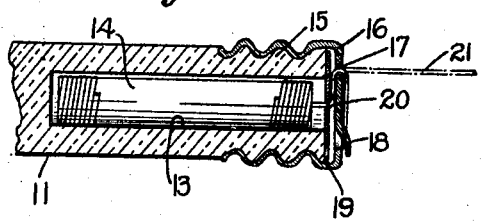
Fig. 2 is an enlarged sectional view of the end of the handle showing the floss containing chamber.
Figure 3:
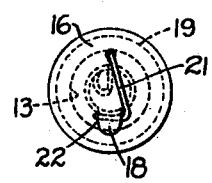
Fig. 3 is an end view of the cap.

Referring to the drawings in detail.

10 designates, generally, a tooth brush comprising a handle 11 and the usual bristles 12. The end of the handle 11 is bored as at 13 to form a container for a spool of dental floss 14. The end of the handle is threaded as at 15 to receive the cap 16.

The cap 16 is a commercial article and is used as a cap for a small bottle in which a spool of dental floss 14 is sold. The cap is perforated as at 17 and is punched to form a lip 18 below said opening 17. A piece of waxed card board 19 is usually found between the top of the bottle and the cap 16, and acts as a moisture proof agent. This disc 19 is adapted to fit on the end of the brush handle 11. The disc 19 is perforated at the center 20 and is adapted to fit on the end of the handle 13 and be held in said position by the cap 16.

In use, the dental floss 21 is drawn out through the opening in the disc 19 and it extends across the face of said disc and out through the opening 17 in the cap. It is then brought down under the lip and is wedged thereunder. The edge 22 of the lip, forms a cutter for the floss.

Having described my invention, what I claim and desire to secure by Letters Patent is:

1. A tooth brush having a handle, said handle being formed to comprise a well therein, a spool of dental floss in said well, a closure for the well and means within said closure, for rendering said well moisture proof.

2. A tooth brush having a handle, said handle being formed at its end to provide a receptacle, a tooth cleansing element in said receptacle, means for rendering said receptacle moisture proof and a removable cap on the end of said handle forming a closure for said receptacle.

3. A tooth brush having a handle, said handle being formed at its end to provide a receptacle, a tooth cleansing element in said receptacle, means for rendering said receptacle moisture proof and a removable cap for the end of said handle forming a closure for said receptacle, said cap being formed to comprise an aperture through which said element can be drawn, and a lip under which said element may be retained.

Signed at New York, city, county, and State of New York, this 4th day of May 1921.

HOWARD R. WARD.